(12) United States Patent
Bozionek et al.

(10) Patent No.: US 8,508,574 B2
(45) Date of Patent: Aug. 13, 2013

(54) WEB BASED CONFERENCE SERVER AND METHOD

(75) Inventors: Bruno Bozionek, Borchen (DE); Karl Klaghofer, Munich (DE); Holger Prange, Munich (DE); Michael Tietsch, Kaufering (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 216 days.

(21) Appl. No.: 12/975,656

(22) Filed: Dec. 22, 2010

(65) Prior Publication Data

US 2011/0161212 A1 Jun. 30, 2011

Related U.S. Application Data

(60) Provisional application No. 61/290,705, filed on Dec. 29, 2009.

(51) Int. Cl.
*H04N 7/14* (2006.01)

(52) U.S. Cl.
USPC ... 348/14.08; 705/30; 348/14.07; 348/E7.083

(58) Field of Classification Search
None
See application file for complete search history.

(56) References Cited

U.S. PATENT DOCUMENTS

| | | | | |
|---|---|---|---|---|
| 4,847,829 A | * | 7/1989 | Tompkins et al. | 370/260 |
| 6,084,628 A | * | 7/2000 | Sawyer | 725/34 |
| 6,269,483 B1 | * | 7/2001 | Broussard | 725/143 |
| 6,757,259 B1 | * | 6/2004 | Hamilton | 370/260 |
| 7,710,449 B2 | * | 5/2010 | Amiel et al. | 348/14.08 |
| 2004/0091086 A1 | * | 5/2004 | Ortel | 379/88.02 |
| 2007/0033630 A1 | * | 2/2007 | Reznik et al. | 725/131 |
| 2007/0143103 A1 | * | 6/2007 | Asthana et al. | 704/200 |
| 2008/0231687 A1 | * | 9/2008 | Baird et al. | 348/14.09 |

* cited by examiner

*Primary Examiner* — Fateh Obaid
(74) *Attorney, Agent, or Firm* — Buchanan Ingersoll & Rooney PC

(57) ABSTRACT

A video conference server in a digital data network that includes at least one audio port and at least one video port, a memory unit, an audio processing unit, a video processing unit, a control unit that generates control signals, a memory device, an access program module and a content program module. The audio and video port connect to a client workstation via the digital data network. The client workstation has a video output and an audio output. The memory unit associates an audio channel and a video channel of the digital data network with a client workstation. The audio processing unit and video processing unit receive signals from the audio and video port and generate signals for transmission to the client workstation.

18 Claims, 5 Drawing Sheets

WEB BASED CONFERENCE SERVER AND METHOD

CROSS REFERENCE TO RELATED APPLICATIONS

This application claims the benefit under 35 U.S.C. §119(e) of U.S. Provisional Patent Application Ser. No. 61/290,705 entitled "Web Based Conference Server and Method," filed on Dec. 29, 2009, the entire disclosure of which is incorporated by reference herein.

BACKGROUND OF THE INVENTION

1. Field of the Invention

The present invention relates to improvements in video conferencing

2. Description of the Related Art

Video communications have evolved over the years from a simple video telephone concept to a sophisticated network for allowing multiple users to participate in a video teleconference. Similarly, wide area data networks like the Internet in the form of the so-called World Wide Web (or simply the "web") have become increasingly important in data communication and so as well as an infrastructure hosting a video server for worldwide video conference.

A video conferencing network includes several remote terminals interconnected through a network. One example of a video conferencing network can be found in U.S. Pat. No. 4,867,829 to Tompkins et al. which is incorporated herein by reference.

Video conference is an opportunity for business communication to reduce travel costs and for the video conference itself cost reduction is a key to further increase the use of video conferences in every-day life and using the Internet may be a promising way to further reduce the costs associated with video conferences. At the same time, proper billing of services has to be taken care of.

In a typical video conference participants see one another on a display which may be at a computer terminal or on a large screen. U.S. Pat. No. 6,084,628 to Sawyer discloses a video conference system in which advertising appears on the display during the video conference. Sawyer further discloses that the advertising can be targeted to the user based upon preferences for each individual user.

Companies find that individual users avoid targeted advertising or promotional content prior to, during, or after a video conference. Therefore, there is a need for a video conference system and method for offering video conference services to users of the web that provides incentives for individual users to view targeted advertising or promotional content.

SUMMARY OF THE INVENTION

The present invention is a web based video conference server and method allowing for a graded billing model, according to which fees may depend on parameters such as used functionality or admission of accepted promotional contents.

We provide a video conference server in a digital data network that has at least one audio port and at least one video port that connect to a client workstation via the digital data network. The digital data network has at least one audio channel and video channel. The client workstation has a video output and an audio output.

The video conference server further includes a memory unit for associating the audio channel and the video channel of the digital data network with the client workstation, an audio processing unit that receives audio signals from the audio port and that generates a broadcast audio signal for transmission to the client workstation via the audio port, a video processing unit that receives video signals from the video ports and that generates a broadcast video signal for transmission to the client workstation via the video port.

In addition, the video conference server includes a control unit that generates a control signal. The control signal regulates the video output and the audio output from the client workstations as required by the broadcast audio signal from the audio processing unit and the broadcast signal from the video processing unit. The control unit is adapted to provide a video conference to a video conference participant located at the client workstation;

Further, the video conference server has, a memory device that stores content provider information for content provided by a content provider, an access program module that provides a link for access to the content provider information that is accepted by the video conference participant, and a content program module that provides information to the video conference participant upon activation of the link and displays content of the content provider accepted by the video conference participant.

In another preferred embodiment the control unit operates to generate a control signal that regulates a billing function.

In another preferred embodiment the billing function depends on used functionality that is selected from the bandwidth of the service of a video conference, the quality of service of a video conference, and an accepted promotional content to be displayed or presented on the plurality of client workstations.

In another preferred embodiment the billing function depends on a total number of participants of the video conference.

In another preferred embodiment the billing function depends on the number of participants of the video conference prepared to accept presentation of promotional contents on their workstations.

In another preferred embodiment the billing function depends on a geographical location of the video conference participant.

In another preferred embodiment the billing function depends on a duration of the video conference.

In another preferred embodiment the billing function depends on a context of the video conference, wherein the context is defined by recognized key words or buzz-words, wherein the recognized key words or buzz-words are detected in an audio stream of the video conference by a speech recognition algorithm that is adapted to recognize the recognized key words or buzz-words in the audio stream.

In another preferred embodiment the billing function depends on recognized objects.

In another preferred embodiment the recognized objects are detected in a video stream of the video conference by an object recognition algorithm that is adapted to recognize the recognized objects in the video stream.

In another preferred embodiment a video conference server further comprises an audio and a video processor on which a audio processing algorithm and a video processing algorithm is configured to process an audio stream and a video stream on the video conference, and a computer storage device to store audio data and video data.

In another embodiment a video conference server further comprises a teleconferencing protocol that allows real time synchronized audio transmissions and real time synchronized video transmissions to promulgate across the digital data network without using a fixed bandwidth or a dedicated time slot transmission medium.

In another preferred embodiment a video conference server further comprises an algorithm that evaluates domain names of the video conference participant and evaluates a geographical location of the video conference participant.

In another preferred embodiment the content of the content provider is adapted to a probable geographical location of the video conference participant.

In another preferred embodiment a video conference server further comprises an algorithm that recognizes at least one word in an audio stream of the video conference and evaluates language used by the video conference participant.

In another preferred embodiment the content of the content provider is adapted to the word in an audio stream that is recognized.

In another preferred embodiment a video conference server further comprises an algorithm that evaluates location information of the video conference participant and recognizes a geographical location of the video conference participant.

In another preferred embodiment a non-transitory computer readable medium contains a web based video conference method that includes a graded billing model. The graded billing model has a fee that depends on used functionality or admission of accepted promotional contents.

In another preferred embodiment a web based video conference method further comprises defining a fraction of fees to be paid by admission of a promotional content by a video conference participant.

In another preferred embodiment a web based video conference method contained in a non-transitory computer readable medium comprises a graded billing model, the graded billing model having a fee, wherein the fee depends on used functionality or admission of accepted promotional contents.

Other details, objects, and advantages of the invention will become apparent as the following description of certain present preferred embodiments thereof proceeds.

BRIEF DESCRIPTION OF THE FIGURES

In the accompanying drawing I have shown certain present preferred embodiments of our window covering in which.

DESCRIPTION OF PREFERRED
EMBODIMENTS OF THE INVENTION

Figure 1:
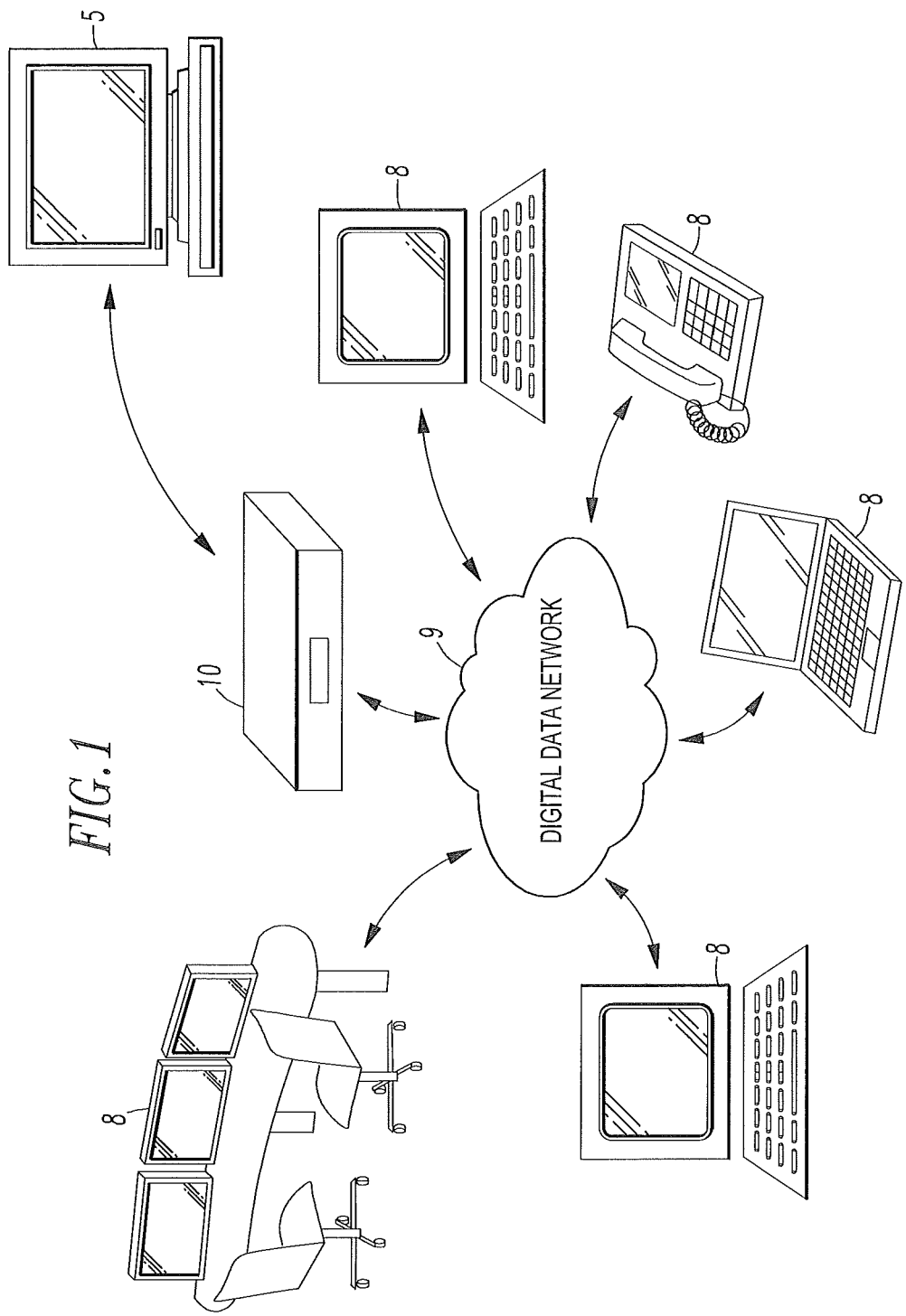
FIG. 1 is a diagram of a present preferred embodiment of a network containing our web based conference server.
Figure 2:
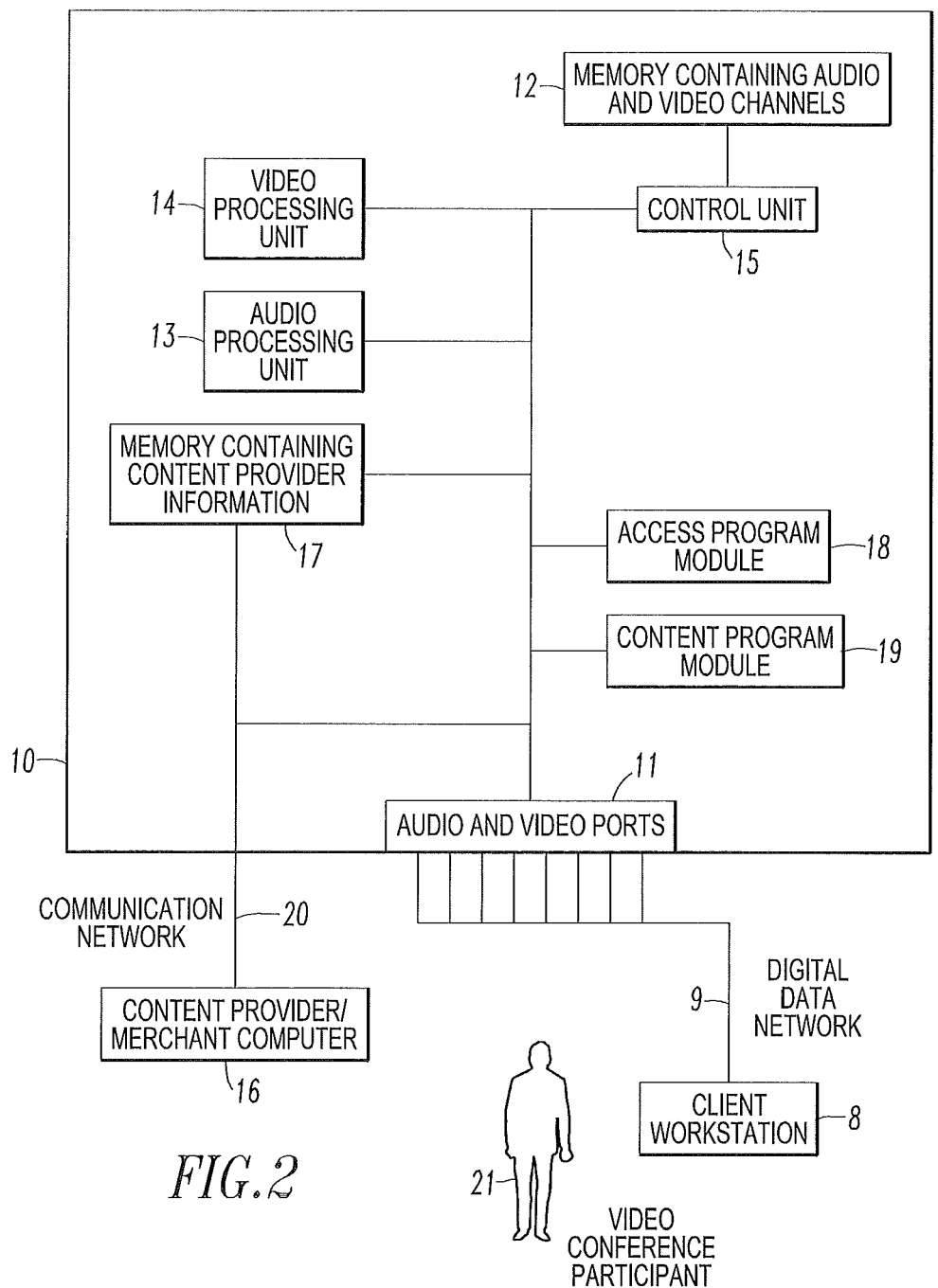
FIG. 2 is a block diagram of the present preferred embodiment of our web based conference server.

According to a preferred embodiment of the present invention shown in FIGS. 1-2, a number of workstations 8 such as personal computers, notebooks, personal digital assistants, video phones, etc. are connected via a local and/or wide area, wired or wireless, digital data network 9, e.g. the Internet. These workstations include a transmission source to send audio and video streams across the network to one or more remote workstations 5 via a video conference server 10. Further, these workstations 8 include a receiver to receive audio and video streams back from the remote workstation 5 via a video conference server 10.

Referring to FIG. 2, the web based conference server 10 has a plurality of audio and video ports 11 for connecting a client workstation 8 to the server 10 via a data network 9, such as the Internet, over audio and video channels. The web based conference server 10 further includes a memory unit 12 for associating the audio and video channels from each client workstation 8 and an audio processing unit 13 for receiving audio signals from the audio ports and generating broadcast audio signals for transmission to the client workstation 8 via the audio ports 11. The web based conference server 10 also includes a video processing unit 14 for receiving video signals from the video ports 11 and generating broadcast video signals for transmission to the client workstation 8 via the video ports 11. A control unit 15 is also included for generating control signals that regulate the audio and video outputs from the client workstation 8 as required to generate the broadcast video and audio signals for a video conference.

In the context of the present invention the term "broadcast" is used for any process of transmitting a message, e.g. a packet, via a network, so that the message will be received by many devices or every device on the network. The scope of such a broadcast may be limited to a broadcast domain. A broadcast in this sense may be possible even in networks that do not support broadcast addressing. For example, neither X.25 nor frame relay have broadcast capability, nor is there any form of Internet-wide broadcast.

The successor to Internet Protocol Version 4 (IPv4), IPv6 also does not implement a broadcast method to prevent disturbing all nodes in a network when only a few may be interested in a particular service. Instead IPv6 relies on multicast addressing, which is a conceptually similar one-to-many routing methodology.

The present invention is not limited to any kind of network technology supporting broadcast addressing or broadcast transmission in a special sense, but shall be applicable in connection with any kind of network technology. Broadcasting a message may be done by independently or separately transmitting a message to each or every device or group of devices that may be reached via a network, regardless of whether the network supports broadcasting or not.

Further, a means for communication of information, such as a communication network 20, may be provided between a content provider 16, e.g. providers of promotional contents, and users on a computer network like the Internet. The web based conference server 10 further comprises a memory device 17 for storing content provider information provided by one or more of the content providers 16, an access program module 18 for providing a link for access to the content provider information accepted by a video conference participant, and a content program module 19 for providing information to the user's terminals upon a user's activation of a link, for display of relevant content of the content provider accepted by a video conference participant (user) 21.

In a preferred embodiment an algorithm may be included that evaluates location information of the video conference participant and recognizes a geographical location of the video conference participant.

In another preferred embodiment the control unit 15 operates to generate control signals that controls a billing function. The billing function may depend on used functionality that includes the bandwidth of the service of a video conference, the quality of service of a video conference, and at least one accepted promotional content to be displayed or presented on the plurality of client workstations, or a combination of any of these.

The billing function may also depend on a total number of participants of the video conference, the number of participants of the video conference prepared to accept presentation of promotional contents on their workstations, a geographical location of the video conference participant, a duration of the video conference, or any combination of these.

In addition, the billing function may depend on the context of the video conference, which may be defined by recognized key words or buzz-words. The recognized key words or buzz-words are detected in an audio stream of the video conference by a speech recognition algorithm that is adapted to recognize the recognized key words or buzz-words in the audio stream.

Further, the billing function may depend on recognized objects that may be detected in a video stream of the video conference by an object recognition algorithm that is adapted to recognize the recognized objects in the video stream.

The content provided to be presented, especially promotional content or advertising content, may be dependent on the geographical location of the video conference participants. An algorithm may be provided that evaluates domain names of the conference participant and evaluates a geographical location of the video conference participant. The content supplied by a content provider may then be adapted based on a probable geographical location of a video conference participant.

A geographical location may be a geophysical location but may also be defined in a different way, e.g. by technical means like a cell in a cellular radio network or semantically like a local train station, etc.

The content provided may also adaptively depend on a context of the video conference, which may be defined by recognized key words ("buzz-words"), recognized in the audio stream of the video conference by help of a speech recognition algorithm which is adapted to recognize certain key words in the audio stream and evaluate language used by the video conference participant. The content supplied by a content provider may then be adapted based on any words in an audio stream that are recognized by the algorithm. The content supplied may also be adapted depending on recognized objects, which have been recognized by an object recognition algorithm in the video stream of the video conference.

In another preferred embodiment the video conference server includes a teleconferencing protocol that allows real time synchronized audio transmissions and real time synchronized video transmissions to promulgate across the digital data network without using a fixed bandwidth or a dedicated time slot transmission medium.

Figure 3:
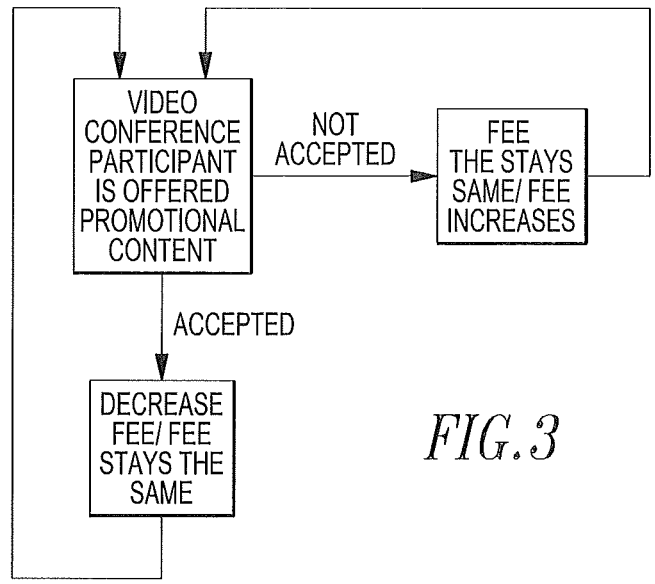
FIG. 3 is a flow chart of a present preferred embodiment of a web based video conference method of the present invention.
Figure 4:
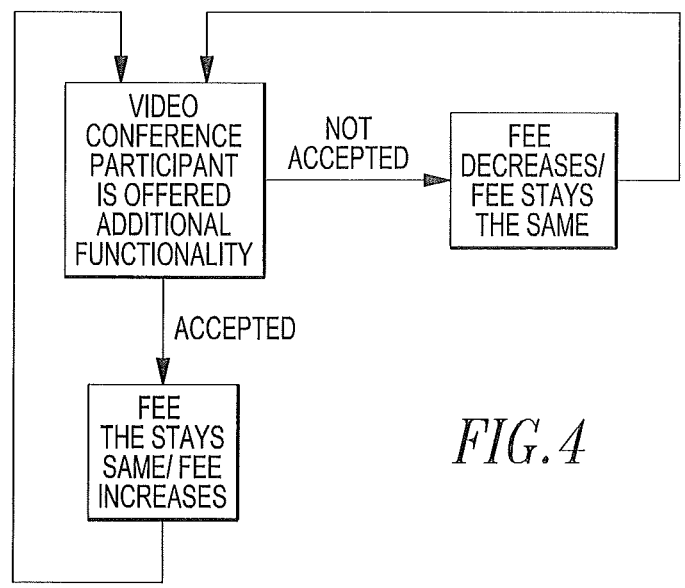
FIG. 4 is a is a flow chart of another preferred embodiment of the web based video conference method of the present invention.

In another preferred embodiment as shown in FIGS. 3-4, a web based video conference method comprises a graded billing model, the graded billing model having a fee, wherein the fee depends on used functionality or admission of accepted promotional contents.

In another preferred embodiment the method defines a fraction of fees to be paid based on a conference participant's acceptance or admission of promotional content. In addition the fees may be reduced during a conference in a stepwise function by an interactive acceptance of the promotional content offered to the video conference participant.

Figure 2A:
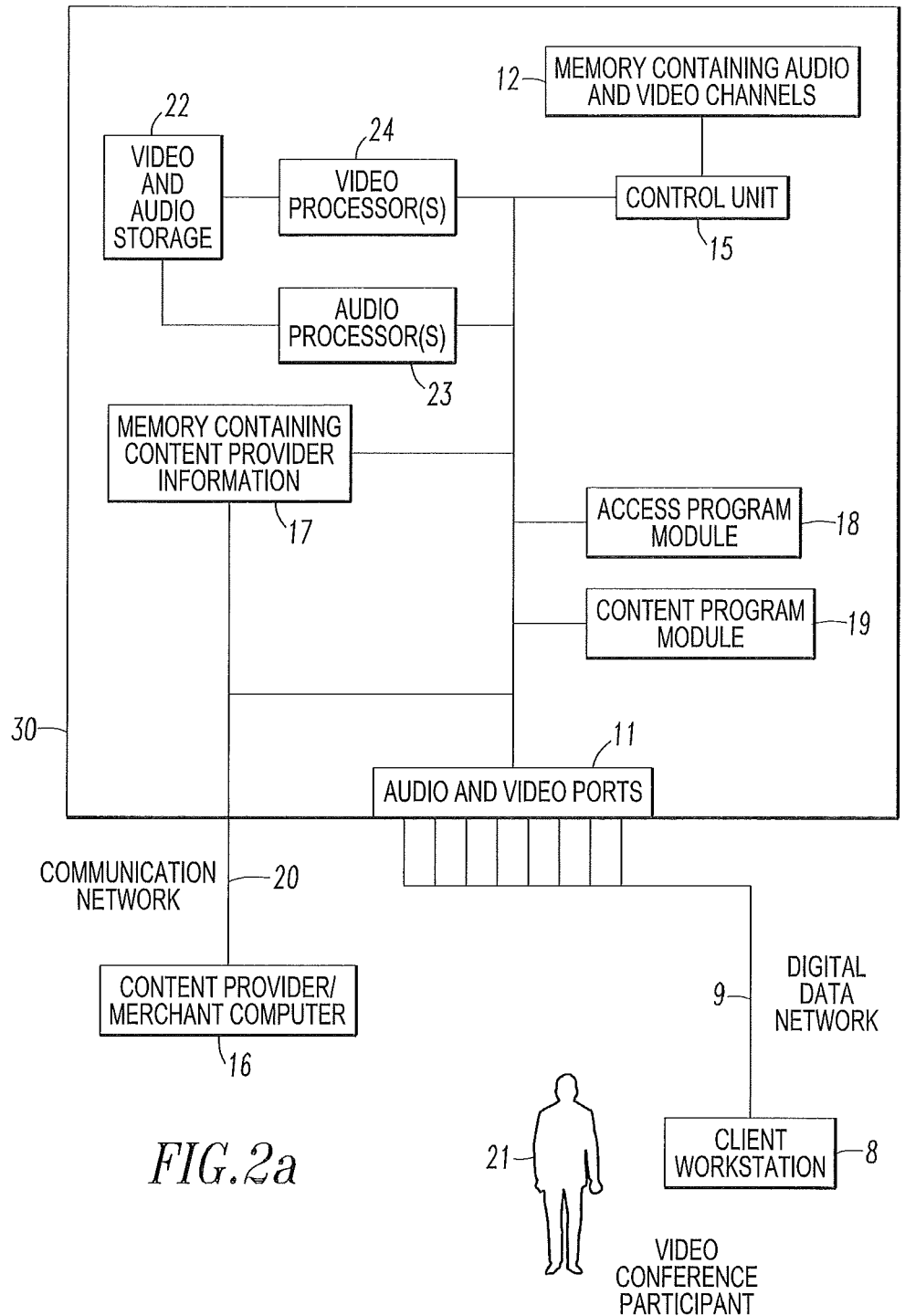
FIG. 2a is a block diagram of another preferred embodiment of our web based conference server.

To achieve the preferred functional characteristics, a video conference server 30 may also be equipped with corresponding hardware and software modules, i.e. audio and video processors 23, 24 as shown in FIG. 2a, on which audio and video processing algorithms may run to suitably process the audio and video streams of the video conference. The server may also include a storage means, such as video and audio computer storage device 22, to store audio and video data.

These components will have to be fast enough to ensure minimal time delay in processing the received data in order to keep asynchronous effects as small as possible. Workstations and servers today have obtained unprecedented computational power and utility. The powerful RISC type CPUs and fast, high resolution graphical displays have made possible multimedia workstations which integrate live audio and video into the programming environment. Graphical User Interface operating systems (GUI) have allowed effective integration of audio and video into application programming.

Two or more of the networked workstations can participate in an n-way video teleconference using a suitable teleconferencing protocol, which allows real time synchronized audio and video transmission across the network without the use of a fixed bandwidth or dedicated time slot transmission medium. Rather, this invention assumes the use of high performance video teleconferencing features using standard digital network transport level protocols such as Internet TCP/IP or UDP/IP. The physical network link may preferably be a high speed FDDI (Fiber Distributed Data Interface) fiber optic link running at a data rate of at least 100 MB/s for maximum performance (about 15 uncompressed black and white frames per second), but can also be virtually any type of high quality digital network. In addition, wide area networking (WAN) technologies can be used with a video teleconferencing protocol. These WAN technologies can be expected to achieve sufficient video frame rates assuming video images compressed with e.g. MPEG, or another video compression technique.

Further, on the server, an algorithm may be installed to compute the proper billing data depending on the above mentioned criteria, and the billing may be done by the server. Appropriate measures may have to be taken to ensure the avoidance of counterfeiting and other problems known to be frequently associated with billing in computer networks. It is therefore preferred to use an automated billing system for securing payment via a distributed network of computers, such as the Internet. Although the present invention is described relative to the Internet, its application is not so limited and is intended to be used on any distributed computer system in which a video conference may be established.

In such a distributed computer network, a merchant or vending computer, which may be called the content provider, contains certain promotional information, which is communicated to a customer's (participant's) computer. As used within this discussion, the term "merchant computer" signifies a computer system, which is used for the purpose of selling goods or services. The vendor itself does not necessarily own the computer; in some situations, the computer is operated on behalf of the merchant or vendor. The video conference server will typically establish a connection with a merchant computer to provide the promotional information to the participants of the video conference.

Figure 2B:
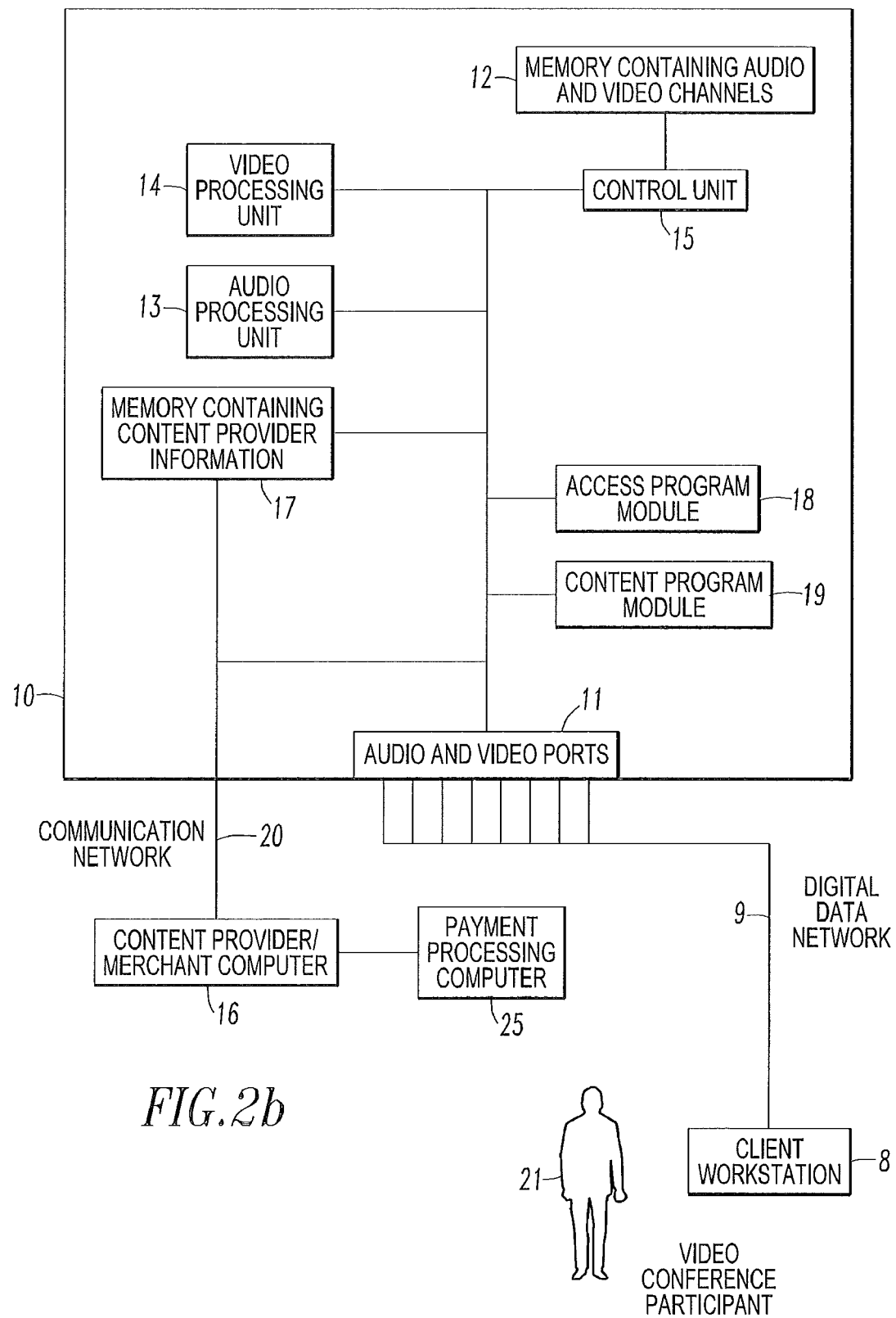
FIG. 2b is a block diagram of another preferred embodiment of our web based conference server.

In another preferred embodiment as shown in FIG. 2b, the customer's (i.e. a participant's) computer, or client workstation, may also be linked to a payment processing computer 25 and the customer's credit card number and the amount to be billed is transmitted to the payment processing computer by the video conference server 10. For security reasons, an encrypting software package may be first downloaded to the customer's computer so that the credit card number is secure from "hackers" who might also be on the network. Although the term "credit card" is used, the invention covers the use of any type of financial guarantee card such as automatic debit accounts, checking account numbers, savings account numbers, and other such devices obvious to those of ordinary skill in the art.

The payment processing computer will preferably automatically contact a bank for verification of the credit card and amount; the bank transmits an authorization to the payment processing computer. This authorization, usually in the form of a number, is stored within the payment processing computer's memory for later reference.

The link or connection with the bank is terminated by the payment processing computer and the payment processing computer turns its attention to the customer's (participant's) computer. The payment processing computer communicates a self-generated transaction indicia, and in some embodiments a password, to the customer's computer. The transaction indicia may be generated by the payment processing computer for proper record keeping. The transaction indicia is also used by the customer to verify that an order has been generated and accepted.

The password is defined by the merchant's computer for the payment processing computer to pass along to the customer's computer. The password is used by the customer's computer to gain access to the video conference service, or to certain functional features of this video conference service, e.g. to certain degrees of service quality like e.g. bandwidth or data rate, suppressing of further promotional contents to be displayed, decreasing the frequency of displaying promotional content to the participants, or other similar functional features.

In order to adapt the billing scheme to geographical data of the participants, the video conference server may evaluate domain names of participants and associate a geographical location with such participants. Also location information originally generated for other services, like emergency calls may be used here, too.

Another possibility would be to recognize words in the audio stream of the video conference and to draw conclusions about the language used by the participants. The promotional contents to be displayed may then easily be adapted to the recognized language and/or to a probable geographical location of the participants. This way promotional contents of local relevance may be displayed to the participants of the video conference, thereby increasing the commercial impact of these contents on the participants.

For the purpose of explaining the present invention several expressions have been used which ought to be understood in the following way:

Promotional content may be presented acoustically or optically or in any way perceivable by a human, e.g. by announcing a commercial message or by displaying a promotional content on the screen of a user's workstation, etc.

While we have shown and described certain present preferred embodiments of our web based video conference server and method and have illustrated certain present preferred methods of making and using the same, it is to be distinctly understood that the invention is not limited thereto but may be otherwise variously embodied and practiced within the scope of the following claims.

We claim:

1. A video conference server for use in a digital data network having at least one audio channel and at least one video channel comprising:
    at least one audio port and at least one video port for connection to at least one client workstation via the digital data network, the at least one client workstation having a video output and an audio output;
    a memory unit for associating the least one audio channel and the at least one video channel of the digital data network with the at least one client workstation;
    an audio processing unit that receives audio signals from the at least one audio port and that generates at least one broadcast audio signal for transmission to the at least one client workstation via the at least one audio port;
    a video processing unit that receives video signals from the at least one video port and that generates at least one broadcast video signal for transmission to the at least one client workstation via the at least one video port;
    a control unit that generates control signals, the control signals are able to regulate the video output and the audio output from the at least one client workstations as required by the at least one broadcast audio signal from the audio processing unit and the at least one broadcast signal from the video processing unit, wherein the control unit is adapted to provide a video conference to at least one video conference participant located at the at least one client workstation;
    a memory device that stores content provider information for content provided by at least one content provider;
    an access program module that provides a link for access to the content provider information that is accepted by the at least one video conference participant; and
    a content program module that provides information to the at least one video conference participant upon activation of the link and displays content of the at least one content provider accepted by the at least one video conference participant; and
    wherein the video conference server recognizes at least one word in an audio stream of the video conference and evaluates the recognized at least one word such that the content provider information of the at least one content provider accessed via the link is adapted based on the at least one word in the audio stream that is recognized by the video conference server.

2. The video conference server of claim 1 wherein the control unit operates to generate control signals that regulate a billing function.

3. The video conference server of claim 2 wherein the billing function depends on used functionality, wherein the used functionality is selected from the group consisting of a bandwidth of a service of the video conference, a quality of service of the video conference, and at least one accepted promotional content to be displayed or presented on the at least one client workstation.

4. The video conference server of claim 2 wherein the billing function depends on a total number of participants of the video conference.

5. The video conference server of claim 4 wherein the billing function depends on the total number of participants of the video conference that are prepared to accept presentation of promotional contents.

6. The video conference server of claim 2 wherein the billing function depends on a geographical location of the at least one video conference participant.

7. The video conference server of claim 2 wherein the billing function depends on a duration of the video conference.

8. The video conference server of claim 2 wherein the billing function depends on a context of the video conference, wherein the context is defined by recognized key words or buzz-words and the recognized key words or buzz-words are detected in an audio stream of the video conference by a speech recognition algorithm that is adapted to recognize the recognized key words or buzz-words in the audio stream.

9. The video conference server of claim 2 wherein the billing function depends on recognized objects.

10. The video conference server of claim 9 wherein the recognized objects are detected in a video stream of the video conference by an object recognition algorithm that is adapted to recognize the recognized objects in the video stream.

11. The video conference server of claim 1 further comprising at least one audio and video processor and a computer storage device to store audio data and video data, wherein the audio and video processor has at least one audio processing algorithm and at least one video processing algorithm that are configured to process an audio stream and a video stream on the video conference.

12. The video conference server of claim 1 further comprising a teleconferencing protocol that allows a real time synchronized audio transmission and a real time synchronized video transmission to promulgate across the digital data network without using a fixed bandwidth or a dedicated time slot transmission medium.

13. The video conference server of claim 1 further comprising an algorithm that evaluates a domain name of the at least one video conference participant and evaluates a geographical location of the at least one video conference participant.

14. The video conference server of claim 13 wherein the content of the at least one content provider is adapted based on a probable geographical location of the at least one video conference participant.

15. The video conference server of claim 1 wherein the content provider information is adapted based upon the recognized at least one word being one of a plurality of predefined key words associated with a portion of the content provider information so that a portion of the content provider information is shown to the at least one video conference participant upon activation of the link.

16. The video conference server of claim 1 wherein the video conference server evaluates location information of the at least one video conference participant and recognizes a geographical location of the at least one video conference participant.

17. The video conference server of claim 16 wherein the content provider information is adapted based upon the recognized geographical location of the at least one video conference participant so that the content provider information accessible via the link is tailored in accordance with the recognized geographical location and the recognized at least one word so that a portion of the content provider information that is shown to the at least one video conference participant upon activation of the link is associated with the recognized geographical location and the recognized at least one word.

18. The video conference server of claim 17 wherein the geographical location is recognized based on one of an evaluated domain name and an identification of a cell of a cellular network.

\* \* \* \* \*